United States Patent [19]
Ward

[11] 4,236,356
[45] Dec. 2, 1980

[54] CUTTING SAW AND CONCRETE GROOVER

[76] Inventor: John D. Ward, 997 E. Athens St., Altadena, Calif. 91001

[21] Appl. No.: 1,050

[22] Filed: Jan. 5, 1979

[51] Int. Cl.³ ............................................. B24B 23/00
[52] U.S. Cl. .......................................... 51/176; 125/4; 125/13 R; 125/14
[58] Field of Search .......................... 51/176, 170 PT; 125/13 R, 135 S, 4, 6, 14

[56] References Cited

U.S. PATENT DOCUMENTS

| 1,404,342 | 1/1922 | Clarke | 51/176 |
| 1,845,666 | 2/1932 | Jennings | 125/4 |
| 2,487,277 | 11/1949 | Siftar | 51/170 PT |
| 2,709,878 | 6/1955 | Olson | 125/13 R |
| 4,145,086 | 3/1979 | Ishihara | 125/6 |

FOREIGN PATENT DOCUMENTS

| 643649 | 4/1937 | Fed. Rep. of Germany | 30/373 |
| 958513 | 3/1950 | France | 125/4 |
| 962371 | 6/1950 | France | 125/4 |

OTHER PUBLICATIONS

Diamond Concrete Channel Cutter DTC-50, Ishihara Kikai Kogyo Co. Ltd., dated prior to Jan. 5, 1979.

Primary Examiner—Harold D. Whitehead
Attorney, Agent, or Firm—Benoit Law Corporation

[57] ABSTRACT

An apparatus for cutting material or grooving concrete has a housing including a curved top for partially accommodating one or more circular saw blades. The housing has a bottom having an opening permitting partial protrusion of the saw blade into cutting engagement with the material or concrete to be cut or grooved. For manual propulsion of the housing along such material or concrete, a curved handle is located on the housing top and has identically dimensioned first and second handle portions extending in parallel to the partially accommodated and protruding saw blade or blades in opposite directions from a central location on the housing top situated opposite the mentioned bottom. The partially accommodated and protruding saw blade is rotated and the housing including the mentioned bottom is maintained in spaced relationship to the material to be cut or concrete to be grooved during operation of the saw blade or blades.

29 Claims, 5 Drawing Figures

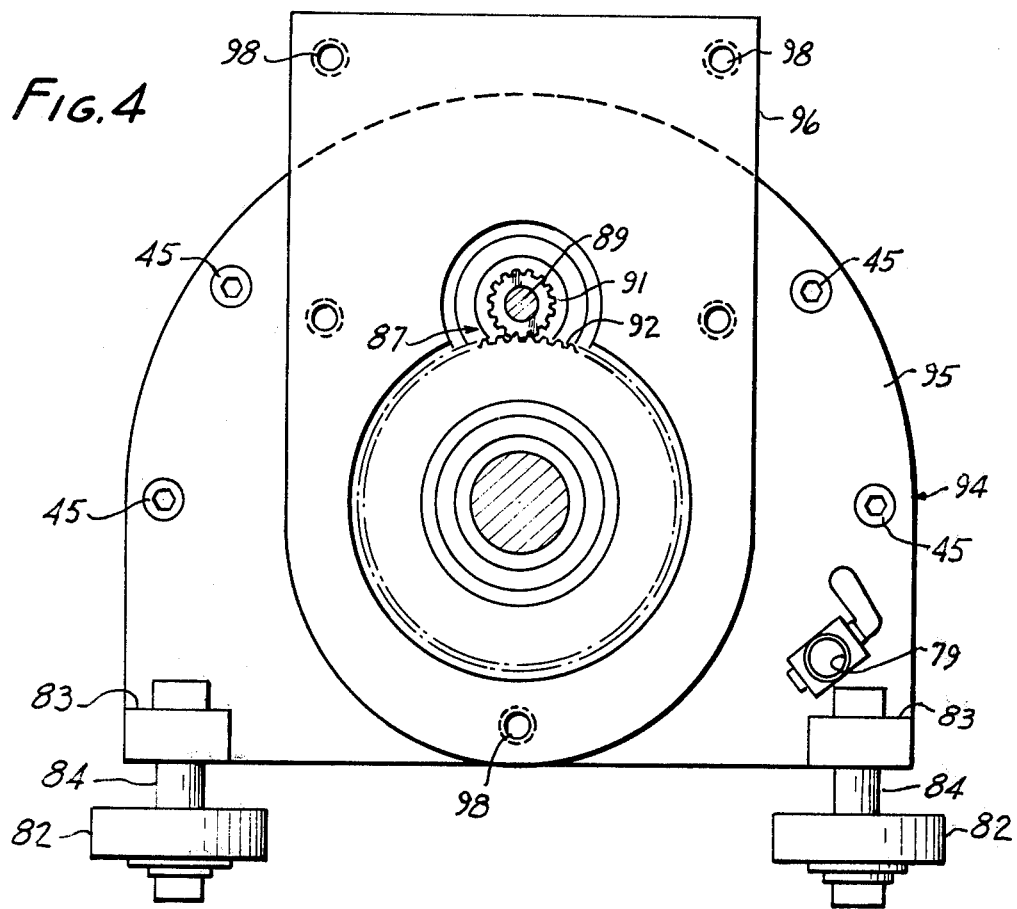
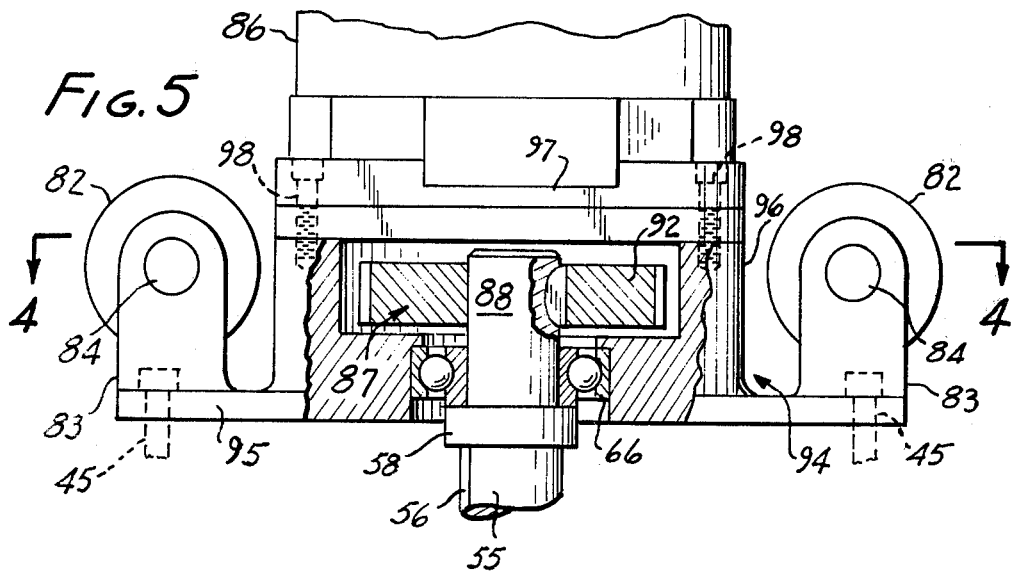

CUTTING SAW AND CONCRETE GROOVER

BACKGROUND OF THE INVENTION

1. Field of the Invention

The subject invention relates to cutting and grooving implements and techniques, including concrete cutting and grooving apparatus, and, more specifically, to apparatus for cutting material with a circular saw blade and apparatus for grooving concrete with a stack of mutually spaced saw blades.

2. Prior-Art Statement

Concrete cutting and grooving equipment is in widespread use at construction sites and in connection with various concrete structures. For instance, concrete grooving machines have been employed in large numbers in order to render concrete highways safer by the provision of a multitude of parallel grooves in their surfaces. A grooving technique is now also employed to increase the safety of concrete steps and similar structures where slipping by people could be a problem. In fact, the utility and increased safety of concrete step grooving has been recognized through pertinent regulatory provisions of the United States Occupational Safety and Health Administration.

In executing concrete step and similar grooving jobs, best results in terms of feasibility, efficiency and quality are generally obtained with equipment that is manually propelled along the concrete step or other structure to be grooved. Unfortunately, highway-type grooving machines are not suitable or adaptable to the grooving of steps or similar structures. A previously proposed concrete step groover was a cross between a plane and skill saw, having a bottom which was supposed to slide along the surface of the concrete structure to be cut, and a handle extending transversely to the direction of sliding advance of the groover. Nothing is known here of any practical operability of that type of prior-art groover.

In this area, and in other fields wherein material is grooved or cut by one or more circular saw blades, there exists a need for handy apparatus that can conveniently be operated on top of steps or in close quarters by right-handed and left-handed persons. There also exists a need for such equipment which is conveniently and efficiently adaptable to either hydraulic or electric drive.

SUMMARY OF THE INVENTION

It is a general object of this invention to overcome the disadvantages and satisfy the needs expressed or implicit in the above mentioned prior-art statement.

It is a related object of this invention to provide improved apparatus and techniques for cutting material with one or more circular saw blades.

It is a germane object of this invention to provide improved apparatus and techniques for grooving concrete with a stack of mutually spaced circular saw blades.

It is also an object of this invention to improve the manual operability of cutting and grooving equipment of the circular saw type.

It is a related object of this invention to provide improved cutting or grooving equipment that is as conveniently manageable and operable by a left-handed person, than by a right-handed person.

Other objects of this invention will become apparent in the further course of this disclosure.

From one aspect thereof, the subject invention resides in apparatus for cutting material with a circular saw blade and, more specifically, resides in the improvement comprising, in combination, a housing including a curved top for partially accommodating the saw blade, and a bottom having an opening permitting partial protrusion of the saw blade from the housing, means for enabling manual propulsion of the housing along the material, including a curved handle on the top extending in parallel to the partially accommodated and protruding saw blade between diametrically opposed locations on the top, means connected to the housing and the saw blade for rotating the partially accommodated and protruding saw blade, and means connected to the housing for guiding the saw blade in cutting engagement with the material and for maintaining the housing including the bottom in spaced relationship to the material during cutting with the saw blade.

From another aspect thereof, the subject invention resides in apparatus for cutting material with a circular saw blade and, more specifically, resides in the improvement comprising, in combination, a housing including a curved top for partially accommodating the saw blade, and a bottom having an opening permitting partial protrusion of the saw blade from the housing, means for enabling manual propulsion of the housing along the material, including a curved handle on the top having identically dimensional first and second handle portions extending in parallel to the partially accommodated and protruding saw blade in opposite directions from a central location on the top situated opposite the bottom, means connected to the housing and the saw blade for rotating the partially accommodated and protruding saw blade, and means connected to the housing for guiding the saw blade in cutting engagement with the material and for maintaining the housing including the bottom in spaced relationship to the material during cutting with the saw blade.

From another aspect thereof, the subject invention resides in apparatus for cutting material with a circular saw blade and, more specifically, resides in the improvement comprising, in combination, a housing including a curved top for partially accommodating the saw blade, having a lateral first opening to one side of the partially accommodated saw blade, and a bottom having a second opening permitting partial protrusion of the saw blade from the housing, means for enabling manual propulsion of the housing along the material, including a handle on the top extending in parallel to the partially accommodated and protruding saw blade, means connected to the housing and saw blade for rotating the partially accommodated and protruding saw blade, including a mounting plate structure for closing the lateral first opening, means for releasably attaching the mounting plate structure to the curved top at the lateral first opening, a shaft for mounting the saw blade, means connected to the housing and mounting plate structure for rotatably mounting the shaft, a motor mounted on the mounting plate structure, and means for coupling the motor to the shaft for driving the saw blade, and means connected to the housing for guiding the saw blade in cutting engagement with the material and for maintaining the housing including the bottom in spaced relationship to the material during cutting with the saw blade.

From another aspect thereof, the subject invention resides in apparatus for grooving concrete with a stack of mutually spaced, parallel circular concrete saw blades and, more specifically, resides in the improveemtn comprising, in combination, a housing including a curved top for partially accommodating the stack of saw blades, and a bottom having openings permitting partial protrusion of the stack of saw blades from the housing, means for enabling manual propulsion of the housing along concrete being grooved, including a curved handle on the top having identically dimensioned first and second handle portions extending in parallel to the saw blades and in opposite directions from a central location on the top situated opposite the bottom, means connected to the housing and saw blade stack for rotating the partially accommodated and protruding saw blade stack, means connected to the housing for guiding the saw blade stack in cutting engagement with the concrete and for maintaining the housing including the bottom in spaced relationship to the concrete during grooving with the saw blade stack, and means for cooling the saw blades.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which:

FIGS. 4 and 5 are an elevatiion with removed second mounting plate and a top view of a mounting plate and motor assembly usable in the apparatus of FIGS. 1 to 3 in accordance with a further preferred embodiment of the subject invention.

DESCRIPTION OF PREFERRED EMBODIMENTS

Figure 1:
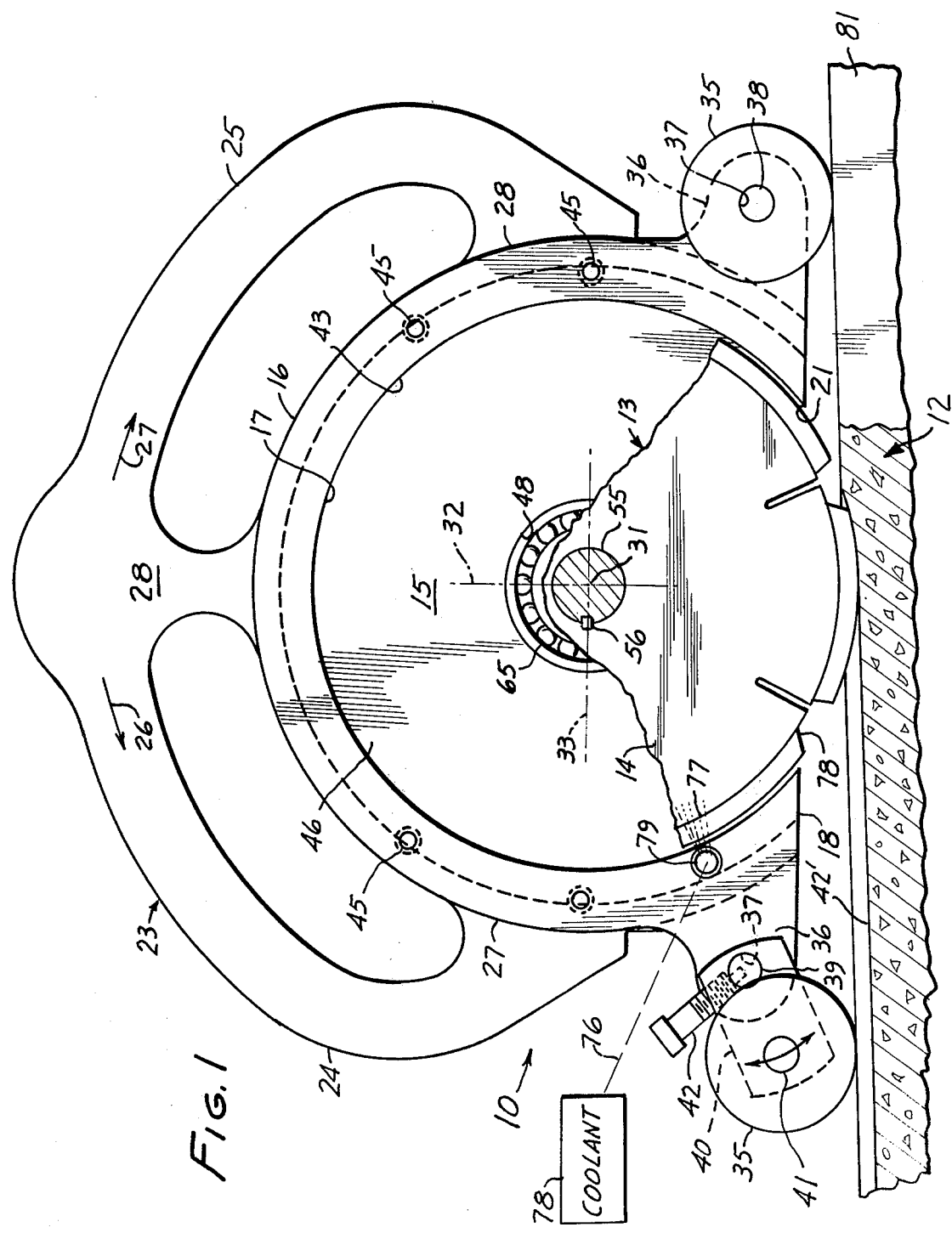
FIG. 1 is an elevation of a concrete grooving apparatus in accordance with a preferred embodiment of the subject invention, and a section through an adjacent concrete slab, with a front mounting plate having been omitted from the apparatus in the showing of FIG. 1 for increased clarity.
Figure 2:
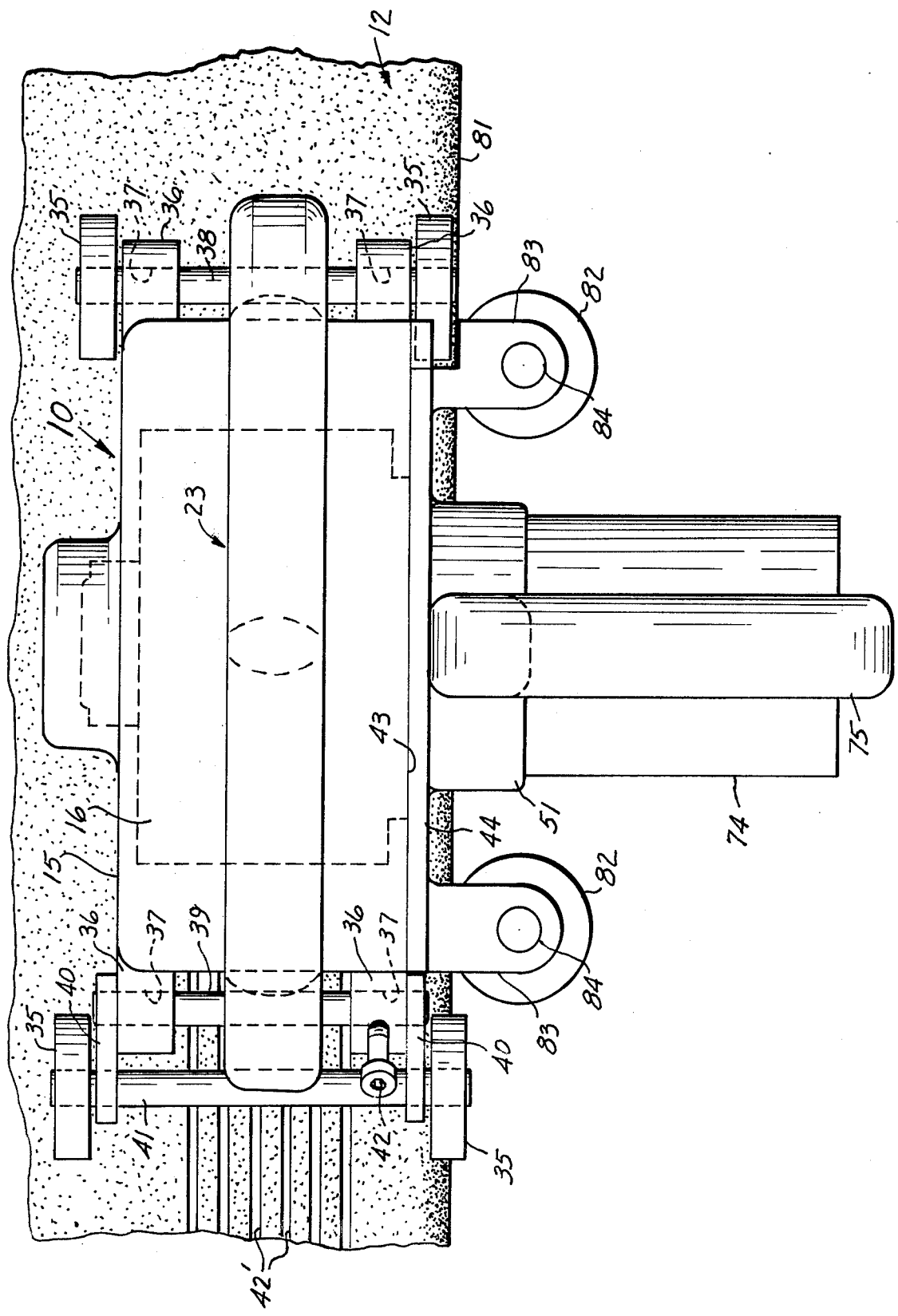
FIG. 2 is a top view of the apparatus shown in FIG. 1, with attached front mounting plate and associated parts.
Figure 3:
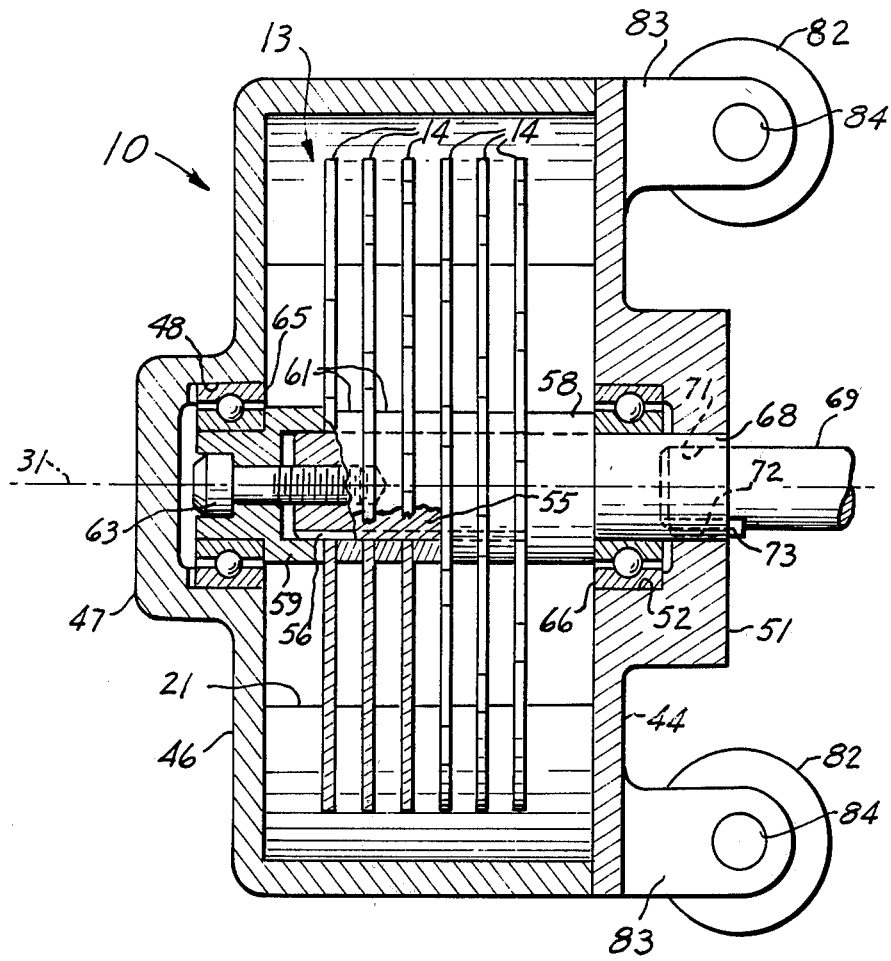
FIG. 3 is a top view, partially in section, of part of the assembly shown in FIGS. 1 and 2.

FIGS. 1 to 3 jointly illustrate an apparatus 10 for grooving concrete 12 with a stack 13 of mutually spaced parallel circular concrete saw blades 14, which may be of the diamond-studded type. According to a preferred embodiment of the subject invention, this apparatus or concrete groover 10 has a housing 15 including a curved top 16 having an internal hollow space or cavity 17 for partially accommodating the stack 13 of saw blades 14. The housing 15 has an open bottom 18. In particular, the housing bottom 18 has an opening 21 permitting partial protrusion of the stack of blades 14 from the housing 15. If desired, a plate (not shown) could be attached to the curved top 16 by suitable fasteners. In that case, such plate (not shown) preferably would have openings permitting partial protrusion of the stack of saw blades from the housing 15. Typically, such openings (not shown) would be in the form of parallel slots corresponding in number and position to the saw blades 14 and being partially coextensive with the saw blades 14 at the bottom of the housing 15.

The saw blades 14 are motor driven as more fully disclosed below. The apparatus 10 as a whole is, however, manually propellable along the concrete 12 being grooved. In practice, this is the best approach for grooving or cutting jobs on steps or similarly dimensioned work pieces or in confined quarters.

In order to enable such manual propulsion of the housing 15, the apparatus 10 includes a curved handle on the housing top 16. In accordance with a preferred embodiment of the subject invention, this handle 23 has identically dimensioned first and second handle portions 24 and 25 extending in parallel to the saw blades 14.

In particular, the handle portions 24 and 25 extend, respectively, in opposite directions 26 and 27 from a central location 28 situated on the curved housing top 16 opposite the bottom 18.

By thus providing the handle 23 in two portions 24 and 25 of equal size, running down opposite sides of the curved housing 16 from the top loctiion 28, left-handed operators are benefited along with right-handed personnel in a more versatile and efficient use of the apparatus 10. In particular, a right-handed person would generally prefer to propel the apparatus 10 via handle 25 along the concrete slab 12 or other material to be grooved or cut. A left-handed person, on the other hand, typically has more power in his left hand and would, therefore, be more effective in propelling the apparatus via handle portion 24. The handle 23 with its bidirectionally extending handle portions 24 and 25 also permits a person to handle the apparatus 10 with both hands, and especially to lift the apparatus with both hands with a minimum of strain because of the favorable weight distribution afforded by the symmetrically configured handle 23.

In accordance with the illustrated preferred embodiment of the subject invention, the handle 23 extends between diametrically opposed locations 27 and 28 on the curved top 16. The first handle portion 24 thus extends from the central location 28 on the top to one of the diametrically opposed locations, namely the location 27, whereas the second handle portion 25 extends from the central location 28 on the top to the other of the diametrically opposed locations, namely the location 28.

Preferably, the stack 13 or blades 14 are rotated about an axis 31 situated in a first plane 32 intersecting the central top location 28, and in a second plane 33 extending at right angles to the first plane 32 and intersecting the diametrically opposed locations 27 and 28. In this fashion, the force applied by the operator is utilized in an optimum manner or at highest efficiency in propelling the grooving or cutting apparatus 10 along the concrete slab or other piece of material during the cutting or grooving operation.

The handle 23 and curved top 16 preferably are integral with each other. For instance, the curved housing top 16 and handle 23 may be cast or injection molded in one piece from aluminum or from another metal or an alloy.

According to the subject invention, the apparatus 10 includes means connected to the housing 15 for guiding the stack 13 or saw blades 14 in cutting engagement with the concrete slab 12 or other material, and for maintaining the housing 15 including the bottom 18 in spaced relationship to the concrete slab 12 or other material during cutting thereof with the saw blades 14. In accordance with the illustrated preferred embodiment, these guiding and spaced relationship maintaining means include wheels 35 which are rotatably and adjustably mounted on the housing 15. In particular, the illustrated housing 15 has four lugs 36 projecting therefrom.

In the apparatus shown in FIGS. 1 and 2, the lugs 36 are integral with the curved housing top 16 and are located at the bottom 18.

Each lug has a bore 37 which extends in parallel to the axis of rotation 31 of the saw blades. Each lug 36 contains a cylindrical wheel supporting member in the form of shafts 38 and 39 extending through bores 37 as shown in FIGS. 1 and 2. The shaft 38 has wheels 35 rotatably mounted on opposite ends thereof.

The shaft 39 has lugs 40 attached to opposite ends thereof and is rotatable in the lugs 36 through which it extends. A further shaft 41 extends through the lugs and has wheels 35 rotatably mounted on opposite end thereof. A set screw 42 is threaded in one of the lugs 36 to permit adjustment of the penetration of the saw blade edges into the concrete slab 12 or other material to be grooved or cut.

Initially, the set screws 42 is loosened and the cylindrical wheel supporting structure including shaft 37, lug 40 and shaft 41 is angularly moved relative to the lug bores 37 until the wheels 35 on shaft 41 project sufficiently downward from the housing 15 or bottom 18 to provide for a desired spacing between the bottom 18 and the concrete slab 12 or other material, and to provide at the same time for a desired depth of the grooves 42' being cut into the concrete slab 12 or other material by the saw blades 14 of the apparatus 10. The set screw 42 is then tightened to arrest angular movement of the shaft 39. If desired, the shaft 39 may have several circumferentially distributed radial bores for receiving a tip of the set screw 42 in order to maintain the wheel mounting lugs 40 in any one of several set positions.

Within the broad scope of the subject invention, other adjustable wheel systems or other workpiece-to-housing spacing means may be employed instead of those shown in the drawings. However, the illustrated preferred embodiment wherein the angularly adjustable shaft 39 with associated lugs 40 and set screw 42 or equivalent elements constitute means connected to the housing 15 for setting such housing 15 at the bottom 18 at various inclinations relative to the top surface of the concrete slab or step or of other material being grooved or cut has special advantages.

The housing 15 has a lateral opening 43 at the curved top 16 to one side of the partially accommodated stack 13 or saw blades 14. The housing also includes a mounting plate structure 44 for closing that lateral opening 43 and fasteners 45 or other means for releasably attaching the mounting plate structure 44 to the curved top 16.

According to the illustrated preferred embodiment of the subject invention, the housing and mouting plate structure mount the stack 13 of saw blades 14 for rotation about an axis 31. In particular, the housing 10 has a rear wall 46 provided with a boss 47 containing a hollow-cylindrical cavity 48. The mounting plate 44 similarly has a boss 51 containing a hollow-cylindrical cavity 52 and a bore 53 coaxial therewith.

The means for rotatably mounting and rotating the stack 13 include a shaft 55 for mounting the saw blades 14. An axial ledge or key 56 engages a corresponding notch 57 in each saw blade, thereby transmitting driving power via the shaft 55 to the saw blades 14 and preventing rotation of these saw blades relative to the shaft 55.

First and second collars 58 and 59 are connected to the shaft 55 for releasably retaining the stack 13 of blades 14 therebetween. The stack 13 includes interdigitated annular spacers 61 on the shaft 55 for retaining the saw blades 14 in mutually spaced, parallel relationship. One of the collars 58 and 59 may be integral with the shaft 55 and the other of these collars may be releasably attachable to the shaft, in order to clamp the saw blades 14 with interdigitated spacers 61 into a unitary stack 13. In the illustrated preferred embodiment shown in FIG. 3, the collar 59 is releasably attached to the shaft 56 with a clamping screw 63, for clamping the saw blade stack 13 against the collar 58 which is preferably integral with the shaft 55.

Roller or ball bearings 65 and 66 are located in the corresponding cylindrical cavities 48 and 52 of the housing wall 46 and mounting plate structure 44. The bearings 65 and 66 engage the collars 59 and 58, respectively, for mounting the shaft 55 for rotation about the axis 31. Conventional spring clip rings and corresponding grooves (not shown) may be employed for preventing the bearings 65 and 66 from axially sliding along the collars 58 and 59.

As best seen in FIG. 1, the shaft 55 is rotatably mounted by the bearings 65 and 66 to extend in the above mentioned vertical plane 32, which intersects the central top portion 28, and in the horizontal plane 33 which intersects the diametrically opposed base portions 27 and 28 of the curved elongate handle 23.

The blade stack mounting structure including the shaft 55 has an axial nipple 68 through which rotary drive power is transmitted to the saw blade 14 from a motor output shaft 69. To this end, the nipple 68 has an axial bore 71 for receiving the power shaft 69 in force-transmitting relationship. As shown, the axial bore 71 may have a key way 72 for receiving an axial key 73 of the power shaft 69.

The power shaft 69, in turn, may be part of a drive motor 74 which is attached to the block 51 of the mounting plate structure 44. An axially extending second handle 75 may be attached to the mounting structure 44 to permit the operator to use both hands on the handles 23 and 75 while operating the cutting or grooving apparatus 10.

The drive motor 74 may, for instance, be a hydraulic motor, inasmuch as hydraulic motors may be operated without a reduction gear. In that case, the power shaft 69 is the output shaft of the hydraulic motor, engaging the shaft structure 55 directly as shown in FIG. 3, with the nipple 68 coupling the motor to the shaft for driving the stack 13 or saw blades 14, and the motor output shaft 69 being coaxial with and coupled to the blade mounting shaft.

The apparatus 10 may also have means for cooling the saw blades 14. In particular, a conduit 76 may conduct water or another coolant 77 from a coolant supply 78 to a coolant distributor 79 in the cavity 17 of the apparatus housing 15. The coolant distributor 79 preferably has at least as many apertures as there are saw blades 14, so that the coolant 77 may be splashed against the saw blades.

The apparatus 10 also includes means for guiding the apparatus along a surface 81 extending parallel to any circular blade 14 in the stack 13 or, in other words, extending at right angles to the surface being cut or grooved. As shwon in FIG. 2, these guiding means preferably include wheels projecting laterally from the housing 15 or mounting plate 44 and lugs 83 for mounting the guiding wheels 82 for rotation about an axis extending parallel to the saw blades 14 or at right angles to the axis of rotation 31 of the saw blade stack 13. In this respect, the surface 81 may be a riser surface of a step being grooved.

For example, the lugs 83 may be integral with and project laterally from the mounting plate structure 44 and have shafts 84 for rotatably mounting the wheels 82.

As shown in FIGS. 4 and 5, the means for rotating the blade stack 13 and shaft 55 may include a rotary drive 86 having an output gear 87, and the shaft 55 may have a keyed end 88 for receiving the output gear 87. In particular, the drive 86 may be an electric motor having an output shaft 89 spaced from the blade mounting shaft 65 or shaft end 88. This motor may then be coupled to the shaft 55 by the gear 87, having an input or pinion 91 connected to the motor output shaft 89, and a gear wheel or output 92 connected to the mounting shaft 55 via the keyed extension 88. The collar 58 and keyed extension 88 may be integral with the blade supporting shaft 55. The remainder of the shaft shown in FIG. 5 may be identical to the shaft shown in FIG. 3, and the collar 58 and bearing 66 constitute first means in the structures of FIGS. 3 and 5 connected to the shaft 65 at one side of the stack 13 for mounting the shaft for rotation relative to the housing 15. Similarly, the shaft structures of FIGS. 3 and 5 include the releasably attached collars 59 and bearing 65 as second means connected to the shaft at an opposite side of the stack 13 for mounting the shaft for rotation relative to the housing 15.

According to FIGS. 4 and 5, the motor 86 is associated with a mounting structure 94 having a first plate 95 for closing the lateral first opening 43 of the curved housing top 16 and for accommodating the gear 87.

In particular, the part of the mounting plate structure 94 just mentioned is similar in configuration to the mounting plate structure 14, having a boss or block 96 for accommodating the gear 87 in cavities corresponding to the gear wheels 91 and 92. As in the case of the mounting plate structure 44, the first plate 95 carries the above mentioned lateral guiding wheels 82 by means of laterally projecting mounting lugs 83.

The mounting structure 94 shown in FIGS. 4 and 5 also includes a second plate 97 seen in FIG. 5. This second plate 97 is attached to the first plate 95 or block 96 by fasteners 98. The motor 86 is similarly attached to the second plate 97, with such second plate being thus attached to the first plate for mounting the preferably electric motor 86.

The mounting structure 94 with attached motor 86 may be attached to the curved housing top 16 in lieu of the mounting plate structure 44 with attached motor 74. In that case, a blade mounting shaft having the keyed extension 88 is employed in lieu of the blade mounting shaft with keyed bore extension 68 shown in FIG. 3.

The subject invention and its illustrated embodiments thus meet the initially recited objectives in providing convenient and effective convertability among different drives, such as hydraulic and electric drives. This driving power medium convertability may be paired with the above mentioned right and left hand usability ot provide an effective manually actuable and easily manageable power tool.

While the illustrated concrete groover is presently believed to constitute the best mode for carrying the subject invention into effect, the utility of the invention extends to other cutting equipment using one or more circular saw blades. Especially in the manually operated circular saw area, the subject invention satisfies a need for equipment that can conveniently and effectively be operated by right and left-handed people, and satisfies also a need for circular saws that are readily adaptable to different power drives, such as hydraulic, electric and gasoline motor drives.

Various other modifications and variations within the spirit and scope of the subject invention will become apparent or will be suggested to those skilled in the art by the subject extensive disclosure.

I claim:

1. In apparatus for cutting material with a circular saw blade, the improvement comprising in combination:
    a housing including a curved top for partially accommodating the saw blade, and a bottom having an opening permitting partial protrusion of the saw blade from the housing;
    means for enabling manual propulsion of the housing along said material, including a curved handle on said top extending in parallel to said partially accommodated and protruding saw blade between diametrically opposed locations on said top;
    means connected to the housing and the saw blade for rotating said partially accommodated and protruding saw blade; and
    means connected to the housing for guiding the saw blade in cutting engagement with said material and for maintaining the housing including said bottom in spaced relationship to said material during cutting with the saw blade.

2. Apparatus as claimed in claim 1, wherein:
    said rotating means include means for rotating said blade about an axis situated in a plane intersecting said locations between which said handle extends.

3. Apparatus as claimed in claim 1, wherein:
    said handle has a first handle portion extending from a central location on said top situated opposite said bottom to one of said diametrically opposed locations, and a second handle portion extending from said central location on said top to the other of said diametrically opposed locations.

4. Apparatus as claimed in claim 3, wherein:
    said rotating means include means for rotating said blade about an axis situated in a first plane intersecting said central location and in a second plane extending at right angles to said first plane and intersecting said diametrically opposed locations.

5. Apparatus as claimed in claim 3, wherein:
    said first and second handle portions have identical sizes.

6. In apparatus for cutting material with a circular saw blade, the improvement comprising in combination:
    a housing including a curved top for partially accommodating the saw blade, and a bottom having an opening permitting partial protrusion of the saw blade from the housing;
    means for enabling manual propulsion of the housing along said material, including a curved handle on said top having identically dimensioned first and second handle portions extending in parallel to said partially accommodated and protruding saw blade in opposite directions from a central location on said top situated opposite said bottom;

means connected to the housing and the saw blade for rotating said partially accommodated and protruding saw blade; and means connected to the housing for guiding the saw blade in cutting engagement with said material and for maintaining the housing including said bottom in spaced relationship to said material during cutting with the saw blade.

7. Apparatus as claimed in claim 1, 2, 3, 4, 5 or 6, wherein:

said handle and curved top are integral with each other.

8. In apparatus for cutting material with a circular saw blade, the improvement comprising in combination:

a housing including a curved top for partially accommodating the saw blade, having a lateral first opening to one side of said partially accommodated saw blade, and a bottom having a second opening permitting partial protrusion of the saw blade from the housing;

means for enabling manual propulsion of the housing along said material, including a handle on said top extending in parallel to the partially accommodated and protruding saw blade;

means connected to the housng and saw blade for rotating said partially accommodated and protruding saw blade, including a mounting plate structure for closing said lateral first opening, means for releasably attaching said mounting plate structure to said curved top at said lateral first opening, a shaft for mounting said saw blade, means connected to said housing and mounting plate structure for rotatably mounting said shaft, a motor mounted on said mounting plate structure, and means for coupling said motor to said shaft for driving said saw blade; and means connected to the housing for guiding the saw blade in cutting engagement with said material and for maintaining the housing including said bottom in spaced relationship to said material during cutting with the saw blade.

9. Apparatus as claimed in claim 8, wherein:

said motor is a hydraulic motor having an output shaft coaxial with, and coupled to, said mounting shaft.

10. Apparatus as claimed in claim 8, wherein:

said motor is an electric motor having an output shaft spaced from said mounting shaft; and said means for coupling said motor to said shaft include a gear having an input connected to said output shaft and an output connected to said mounting shaft.

11. Apparatus as claimed in claim 10, wherein:

said mounting plate structure has a first plate for closing said lateral first opening and accommodating said gear, and a second plate attached to said first plate for mounting said electric motor.

12. Apparatus as claimed in claim 8, 9, 10 or 11, wherein:

said handle is curved and extends between diametrically opposed locations on said top.

13. Apparatus as claimed in claim 8, 9, 10 or 11, wherein:

said handle is curved and extends between diametrically opposed locations on said top; and said mounting shaft extends in a plane intersecting said diametrically opposed locations.

14. Apparatus as claimed in claim 8, 9, 10 or 11, wherein:

said handle has first and second handle portions extending in opposite directions from a central location on said top situated opposite said bottom.

15. Apparatus as claimed in claim 8, 9, 10 or 11, wherein:

said handle has first and second handle portions having identical sizes and extending in opposite directions from a central location on said top situated opposite said bottom.

16. In apparatus for grooving concrete with a stack of mutually spaced, parallel circular concrete saw blades, the improvement comprising in combination:

a housing including a curved top for partially accommodating the stack of saw blades, and a bottom having an opening permitting partial protrusion of the stack of saw blades from the housing;

means for enabling manual propulsion of the housing along concrete being grooved, including a curved handle on said top having identically dimensioned first and second handle portions extending in parallel to said saw blades and in opposite directions from a central location on said top situated opposite said bottom;

means connected to the housing and saw blade stack for rotating said partially accommodated and protruding saw blade stack;

means connected to the housing for guiding the saw blade stack in cutting engagement with the concrete and for maintaining the housing including said bottom in spaced relationship to the concrete during grooving with the saw blade stack; and means for cooling said saw blades.

17. Apparatus as claimed in claim 16, wherein:

said first and second handle portions extend, respectively, to diametrically opposed locations on said top.

18. Apparatus as claimed in claim 17, wherein:

said rotating means include means for rotating said blade stack about an axis situated in a first plane intersecting said central location and in a second plane extending at right angles to said first plane and intersecting said diametrically opposed locations.

19. Apparatus as claimed in claim 16, 17 or 18, wherein:

said handle and curved top are integral with each other.

20. Apparatus as claimed in claim 16, 17 or 18, wherein:

said housng has a lateral opening at said curved top to one side of said partially accomodated saw blade, a mounting plate structure for closing said lateral opening and means for releasably attaching said mounting plate structure to said curved top; and said rotating means include a shaft for mounting said saw blade, means connected to said housing and mounting plate structure for rotatably mounting said shaft, a motor mounted on said mounting plate structure, and means for coupling said motor to said shaft for driving said saw blade.

21. Apparatus as claimed in claim 16, 17, 18, 19 or 20, wherein:

said cooling means include means connected to said housing for conducting a coolant to said housing and a distributor for guiding said conducted coolant into contact with said saw blades.

22. Apparatus as claimed in claim 1, 6, 8 or 16, wherein:
said guiding and spaced relationship maintaining means include wheels and means for rotatably mounting said wheels on said housing.

23. Apparatus as claimed in claim 1, 6, 8 or 16, wherein:
said guiding and spaced relationship maintaining means include means connected to said housing for setting the housing at said bottom at various inclinations relative to a surface of said material.

24. Apparatus as claimed in claim 1, 6, 8 or 16, including:
means for guiding said apparatus along a surface extending parallel to any circular saw blade, including wheels projecting laterally from said housing and means for mounting said wheels for rotation about an axis extending parallel to the latter saw blade.

25. Apparatus as claimed in claim 16 or 17, wherein:
said rotating means include a shaft for mounting said stack of saw blades, first means connected to the shaft at one side of said stack for mounting the shaft for rotation relative to said housing, second means connected to said shaft at an opposite side of said stack for mounting the shaft for rotation relative to said housing, and means connected to the shaft for rotating the shaft and mounted stack of saw blades.

26. Apparatus as claimed in claim 25, wherein:
said stack include spacers on the shaft for retaining the saw blades in mutually spaced, parallel relationship.

27. Apparatus as claimed in claim 25, wherein:
said first and second means include first and second collars connected to said shaft for releasably retaining said stack of blades therebetween.

28. Apparatus as claimed in claim 25, wherein:
said shaft and stack rotating means include a motor having an output shaft; and
said shaft has a bore for receiving said output shaft in force-transmitting relationship.

29. Apparatus as claimed in claim 25, wherein:
said shaft and stack rotating means include a rotary drive having an output gear; and
said shaft has a keyed end for receiving said output gear.

* * * * *